(12) United States Patent
Almalfouh et al.

(10) Patent No.: US 10,110,398 B2
(45) Date of Patent: Oct. 23, 2018

(54) ADAPTIVE RECEIVE DIVERSITY

(71) Applicant: Apple Inc., Cupertino, CA (US)

(72) Inventors: Sami M. Almalfouh, San Jose, CA (US); Navid Damji, Cupertino, CA (US); Johnson O. Sebeni, Fremont, CA (US); Tarik Tabet, San Jose, CA (US)

(73) Assignee: Apple Inc., Cupertino, CA (US)

( * ) Notice: Subject to any disclaimer, the term of this patent is extended or adjusted under 35 U.S.C. 154(b) by 295 days.

(21) Appl. No.: 15/179,647

(22) Filed: Jun. 10, 2016

(65) Prior Publication Data
US 2017/0359200 A1   Dec. 14, 2017

(51) Int. Cl.
| | | |
|---|---|---|
| H04W 52/02 | (2009.01) | |
| H04L 25/02 | (2006.01) | |
| H04W 24/08 | (2009.01) | |
| H04B 7/08 | (2006.01) | |
| H04W 76/28 | (2018.01) | |

(52) U.S. Cl.
CPC ........... *H04L 25/0204* (2013.01); *H04B 7/08* (2013.01); *H04W 24/08* (2013.01); *H04W 76/28* (2018.02)

(58) Field of Classification Search
CPC .. H04W 24/08; H04W 52/02; H04W 52/0245
See application file for complete search history.

(56) References Cited

U.S. PATENT DOCUMENTS

| | | | |
|---|---|---|---|
| 2009/0017766 A1 | 1/2009 | Patel et al. | |
| 2009/0029652 A1* | 1/2009 | Xie | H04W 52/0245 455/69 |
| 2011/0128899 A1* | 6/2011 | Su | H04W 52/0245 370/311 |
| 2012/0219040 A1 | 8/2012 | Valentine et al. | |

(Continued)

OTHER PUBLICATIONS

3rd Generation Partnership Project; Technical Specification Group Radio Access Network; Evolved Universal Terrestrial Radio Access (E-UTRA); Carrier aggregation enhancements; User Equipment (UE) and Base Station (BS) radio transmission and reception (Release 11), 3GPP TR 36.823 V.11.0.1, Sep. 2013, Valbonne-France.

(Continued)

*Primary Examiner* — Charles C Jiang
*Assistant Examiner* — Will Lin
(74) *Attorney, Agent, or Firm* — Dickinson Wright RLLP

(57) ABSTRACT

A wireless device comprises a primary antenna, a primary transceiver, one or more secondary antennas and one or more receive diversity chains. The receive diversity chains, in some embodiments, include transceiver capability. The wireless device measures and collects various statistics. Based on the statistics, the wireless device enables or disables one or more of the receive diversity chains with respect to a cellular radio access technology (RAT). A disabled receive diversity chain, in some instances is then powered down. During an interval when a receive diversity chain is disabled, the control logic periodically or on an (Continued)

event-driven basis enables a given receive diversity chain to probe channel quality indicator (CQI) and channel rank values. In some embodiments, a time interval for collecting a portion of the statistics, is adapted or backed off in anticipation of use of the receive diversity chain, based on traffic circumstances.

20 Claims, 11 Drawing Sheets

(56) References Cited

U.S. PATENT DOCUMENTS

| | | |
|---|---|---|
| 2012/0250541 A1 | 10/2012 | Ko et al. |
| 2012/0257523 A1 | 10/2012 | Kasturi et al. |
| 2012/0287815 A1 | 11/2012 | Attar |
| 2013/0044723 A1 | 2/2013 | Li et al. |
| 2013/0170416 A1 | 7/2013 | Gopalan et al. |
| 2013/0201834 A1 | 8/2013 | Klingenbrunn et al. |
| 2013/0242772 A1* | 9/2013 | Attar ............ H04B 7/0871 370/252 |
| 2014/0098694 A1* | 4/2014 | Damji ............ H04W 52/0229 370/252 |
| 2014/0161024 A1 | 6/2014 | Speight et al. |
| 2016/0043815 A1* | 2/2016 | Panaitopol ............ H04W 16/14 370/252 |
| 2016/0381643 A1* | 12/2016 | Ilitzky ............ H04W 52/02 370/311 |
| 2017/0251518 A1* | 8/2017 | Agiwal ............ H04W 24/08 |
| 2017/0311264 A1* | 10/2017 | Raghupathy ...... H04W 52/0245 |

OTHER PUBLICATIONS

LTE; Evolved Universal Terrestrial Radio Access (E-UTRA); Multiplexing and channel coding (3GPP TS 36.212 version 13.1.0 Release 13), ETSI TS 136 212 V13.1.0, Apr. 2016, France, Cover Page + pp. 38-53.

LTE; Evolved Universal Terrestrial Radio Access (E-UTRA); Physical channels and modulation (3GPP TS 36.211 version 13.1.0 Release 13), ETSI TS 136 211 V13.1.0, Apr. 2016, France, Cover Page + pp. 74-82.

LTE; Evolved Universal Terrestrial Radio Access (E-UTRA); Physical layer procedures (3GPP TS 36.213 version 13.1.1 Release 13), ETSI TS 136 213 V13.1.1, May 2016, France, Cover Page + pp. 50-72.

LTE; Evolved Universal Terrestrial Radio Access (E-UTRA); Medium Access Control (MAC) protocol specification (3GPP TS 36.321 version 13.1.0 Release 13), ETSI TS 136 321 V13.1.0, Apr. 2016, France, Cover Page + pp. 1-17.

* cited by examiner

ADAPTIVE RECEIVE DIVERSITY

FIELD

The described embodiments relate generally to multiple access wireless communications using electronic devices, including systems and techniques for determining whether one or more transceiver chains should be employed, and if employed, how employed.

BACKGROUND

Some wireless device architectures include multiple antennas and multiple transceiver chains. A wireless device is sometimes referred to as a user equipment (UE). The multiple antennas and multiple transceiver chains allow for multiple input-multiple output (MIMO) communication. Using MIMO techniques, multiple streams can be transmitted in a given direction at the same time in the same wireless frequency bandwidth.

Some embodiments disclosed herein are illustrated with respect to the Third Generation Partnership Project (3GPP) Long Term Evolution (LTE) standard. Further details of LTE standards can be found in i) ETSI TS 136.213 v13.1.1, May 2016, "Physical layer procedures," (hereinafter "LTE 36.213"), ii) ETSI TS 136.212 v13.1.0, April 2016, "Multiplexing and channel coding," (hereinafter "LTE 36.212"), iii) ETSI TS 136.211 v13.1.0, April 2016, "Physical channels and modulation," (hereinafter "LTE 36.211"), iv) ETSI TS 136.321, April 2016, "Medium Access Control (MAC) protocol specification," (hereinafter "LTE 36.321") and v) 3GPP TR 36.823 v11.0.1 (September 2013), "Carrier aggregation enhancements," (hereinafter "3GPP 36.823").

SUMMARY

Representative embodiments set forth herein disclose various systems and techniques for efficiently sounding uplink channels in wireless access systems and for efficiently transmitting and receiving uplink signals in such systems.

Adaptive receive diversity (ARD) includes algorithms for toggling the state of a given UE receive diversity chain between an Receive Diversity (RXD) OFF state and an RXD ON state. A given wireless device, in some embodiments, includes two or more receive diversity chains. A given receive diversity chain, in some embodiments, includes a transmit chain and so can perform as a transceiver chain. The wireless device disclosed herein includes two or more physical antennas. In some embodiments, a primary antenna is physically connected to a primary transceiver chain. The primary transceiver chain accepts radio frequency (RF) band input signals from the primary antenna and provides baseband signals to a baseband processor. In the other direction, the primary transceiver chain accepts baseband signals from the baseband processor and provides RF output signals to the primary antenna. The wireless device disclosed herein includes one or more receive diversity chains. The receive diversity chains are connected to one or more of the secondary antennas. Like the primary transceiver chain and the primary antenna, the receive diversity chains accept RF signals from the secondary antennas and provide baseband signals to the baseband processor. In some embodiments, there are two or more baseband processors.

Device architectures disclosed herein can accommodate more than one radio access technology (RAT). In some embodiments, devices support an LTE RAT, an Institute of Electrical and Electronics Engineers (IEEE) 802.11 Wi-Fi RAT, and/or a Bluetooth® RAT. A protocol layer description of the multi-RAT device includes simultaneous support for more than one baseband, and more than one MAC layer.

A purpose of communication is to convey data. Practical considerations include the amount of energy needed to convey a given amount of data, a rate at which data is conveyed, and performance measures such as block error rate (BLER). In some embodiments, various variables are considered to determine whether a given receive diversity chain should be employed. In some embodiments, a decision is made as to whether a receive diversity chain should be provided with battery power so that the receive diversity chain can improve reception of data present in an LTE downlink (DL) signal received from a base station. The DL signals include carrier aggregation signals in some scenarios. In some embodiments, the receive diversity chain is no longer focused, after a state change, on an LTE DL signal, but instead is employed to recover a signal associated with another RAT, such as Bluetooth® or Wi-Fi.

Radio signals propagate between a wireless device and a base station via various paths, and reception is subject to various levels of noise and interference. Consider a DL signal. At the wireless device receiver, fewer bits of error-free data can be recovered the weaker the desired DL signal is, the stronger an additive noise or interference is, and the lower diversity order of the DL signal that the wireless device has. Diversity order refers to the number of statistically independent copies of the transmitted signal visible at the receiver. A secondary antenna often provides a version of a DL signal with significant decorrelation from the version present on the primary antenna. These phenomena are quantified, for example, by statistics and measurements such as signal to noise ratio (SNR), channel quality indicator (CQI), channel state information (CSI), and/or channel rank. More error free bits can be recovered, up to a limit, by spending more energy deployed in filtering, sampling, and processing a received signal. The limit depends on, for example, transmit modulation format, a number of MIMO streams transmitted, SNR at the receiver, and channel rank.

By considering various measurements and statistics, embodiments disclosed herein provide techniques for determining whether a given receive diversity chain should be used for diversity reception.

Radio channel conditions change as a wireless device moves through space and as reflectors between a wireless device and a base station move. Radio channel conditions also change as various other devices transmit or cease transmitting. A given secondary antenna and/or receive diversity chain, in some scenarios, is not useful for improving throughput at a first moment in time, but becomes useful due to changed conditions at a later moment in time. In embodiments disclosed herein, techniques for evaluating channel conditions pertinent to an unused secondary antenna and/or receive diversity chain are provided. Because a base station can transmit one or more streams to a wireless device using MIMO techniques, the base station needs to know something about channel conditions in determining a modulation order and number of MIMO streams (codewords) to be used in transmission. This information is provided in the form of CQI and channel rank. Embodiments disclosed herein promote a continuity in reporting of channel conditions and refreshing of channel condition information while regularly evaluating the utility of providing power to a given receive diversity chain for demodulation of signals coming from the base station.

When a retransmission is expected to be needed, a time interval for detecting an absence of scheduling activity is backed off (or extended or lengthened) in some embodiments, to increase the interval during which a given receive diversity chain is available to assist in providing diversity samples to demodulate the expected scheduling message associated with the retransmission attempt.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

System

Figure 1:
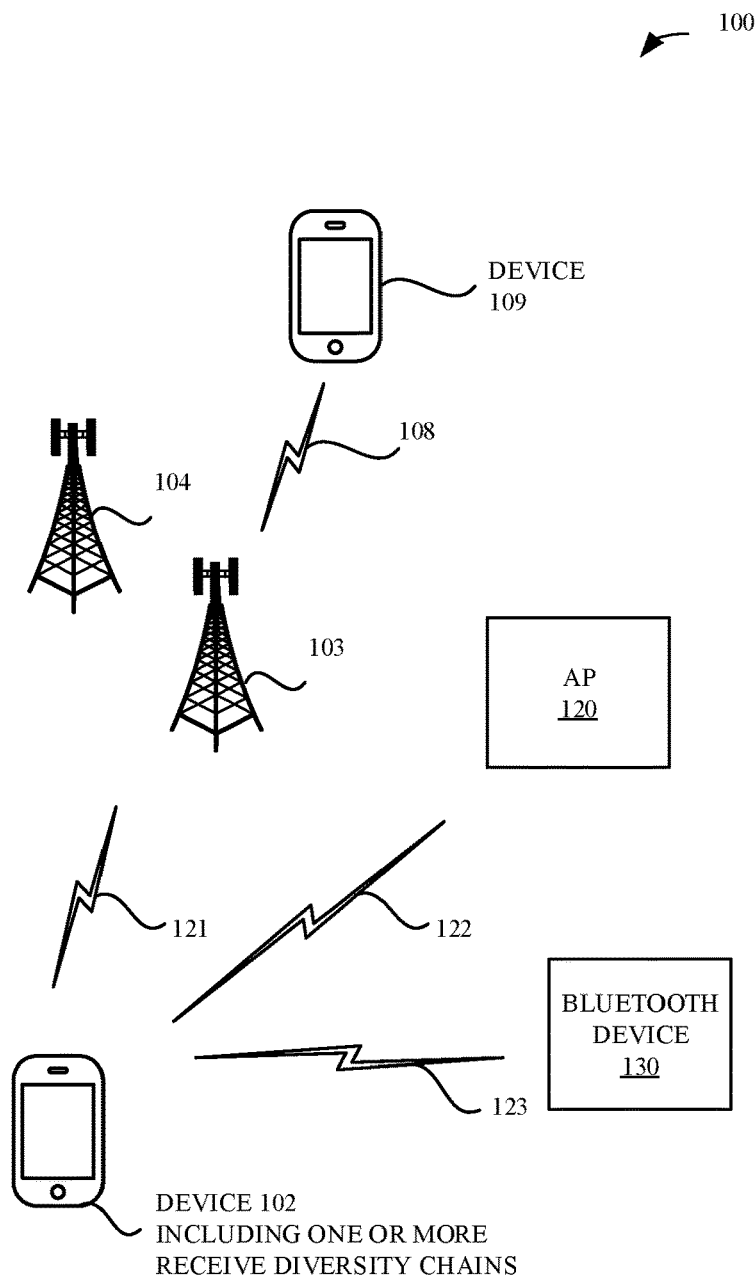
FIG. 1 illustrates an exemplary system including a wireless device with one or more receive diversity chains, according to some embodiments.

FIG. 1 illustrates a device 102 in a system 100. The device 102 includes one or more receive diversity chains. A receive diversity chain, in some embodiments, includes transceiver functionality. Device 102 and a device 109 are shown in communication with LTE infrastructure represented by base stations 103 and 104. The wireless link from the device 102 to the base station 103 is represented schematically as a connection 121. A single interval of time wherein the device 102 is substantially served by the base station 103 is referred to herein as a session. The device 102, in some embodiments, also communicates with Wi-Fi devices, for example, an access point (AP) 120 via a connection 122. The device 102, in some embodiments, communicates with Bluetooth® devices, for example, a Bluetooth device 130 via a connection 123. The device 102 can use one or more of the receive diversity chains for simultaneous communication over combinations of the connections 121, 122, and/or 123. The device 102 frequently operates based on battery power, and extending a time between required recharging of the battery is a user-friendly feature.

Device Architecture

Figure 2A:
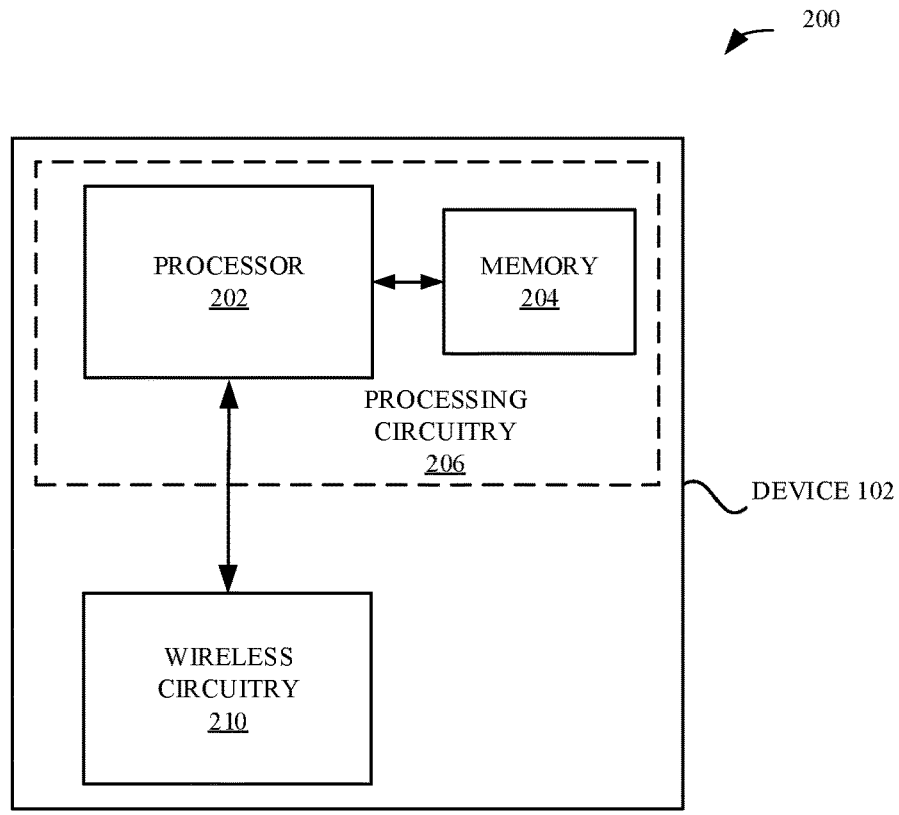
FIG. 2A illustrates exemplary wireless circuitry, processor and memory of the wireless device, according to some embodiments.
Figure 2B:
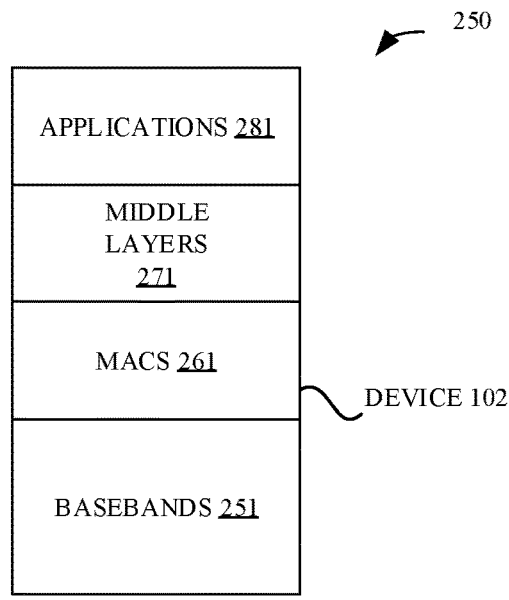
FIG. 2B illustrates an exemplary layer model of the wireless device, according to some embodiments.

FIG. 2A illustrates further detail of the device 102. The device 102 includes wireless circuitry 210 and processing circuitry 206. The processing circuitry 206 includes one or more processors, here represented as a processor 202. The processors communicate with one or more memories, here represented as a memory 204. FIG. 2B illustrates a layer model of the device 102. The layer model includes basebands 251 and medium access control entities (MACs) 261. The basebands 251 and MACs 261 provide software and/or hardware components to support one or more RATs. For example, the basebands 251 and MACs 261, in some embodiments, support, in addition to, LTE, Bluetooth® and/or Wi-Fi. FIG. 2B illustrates applications 281, supported by middle layers 271, supported by MACs 261 and basebands 251. The applications 281, via a user interface, provide functionality to a user. The applications 281 rely on the lower layers to provide data to them over, for example, the connections 121, 122, and/or 123. The applications 281 rely on the lower layers to provide a conduit for outgoing data to travel to, for example, the base station 103 over the connection 121, the Wi-Fi AP 122 over the connection 122, and/or the Bluetooth® device 130 over the connection 123. The effective rate of flow of such data can be referred to as throughput. Throughput refers to error-free, non-redundant, data received.

Wireless Circuitry

Figure 3:
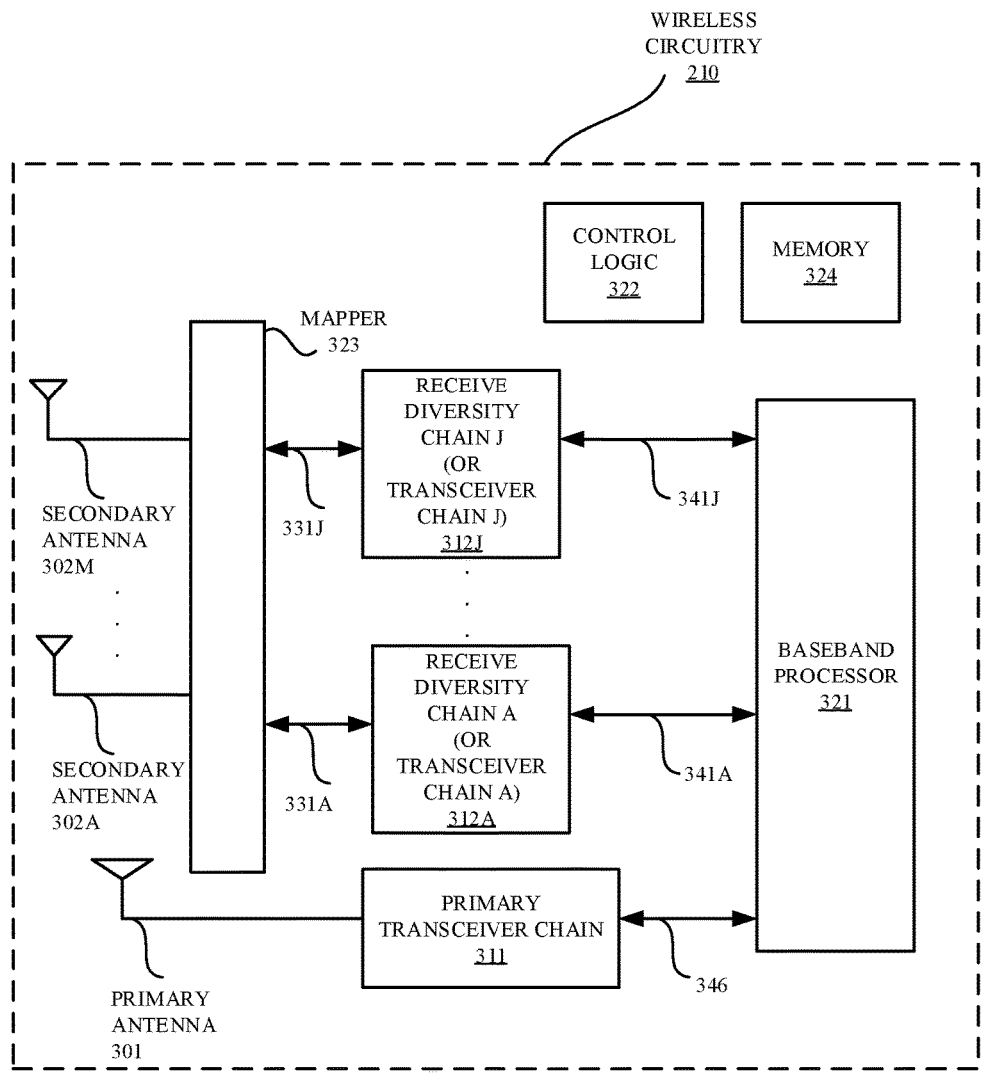
FIG. 3 illustrates an exemplary architecture of the wireless circuitry, according to some embodiments.

FIG. 3 provides further details of the wireless circuitry 210. The wireless circuitry 210 includes a primary antenna 301, a primary transceiver chain 311, a baseband processor 321 and memory 324. The wireless circuitry 210 also includes one or more secondary antennas, represented in FIG. 3 as 302A through 302M. In some embodiments, there is only one secondary antenna, in which case the label 302A and the label 302M represent that one secondary antenna. The wireless circuitry 210 also includes one or more receive diversity chains, represented in FIG. 3 as receive diversity chain A (reference numeral 312A) through receive diversity chain J (reference numeral 312J). The secondary antennas 302A through 302M are coupled to the receive diversity chains via a mapper 323. Mapper 323 may also be referred to as a switch or a mapper switch. The mapper 323 is coupled to the receive diversity chains 312A through 312J via RF signal lines 331A through 331J. The mapper, in some embodiments, comprises switchable RF paths or transmission lines between the secondary antennas (302A ... 302M) and the receive diversity chains (312A ... 312J). One or more of the secondary antennas 302 can be mapped to one or more of the receive diversity chains 312 using the mapper 323. The operation of the mapper 323 and power to each of the receive diversity chains 312A through 312J is determined by control logic 322. The mapper 323 is a switch and a switch for purposes of this description provides one or more of many to one, and one to one mappings. In some embodiments, multiple receive diversity chains are mapped to a single one of the secondary antennas. For example, multiple receive diversity chains are mapped to a single one of the secondary antennas in some multi-carrier (carrier aggregation) scenarios. A switch associates inputs and outputs based on some configured mapping. In some embodiments, mapper 323 simply connects inputs to outputs according to control signals received from the control logic 322. Control logic 322 is illustrated in wireless circuitry 210. In some embodiments, control logic 322 is performed by the baseband processor 321 by executing instructions stored in memory 324. Control lines engage or power-up a given receive diversity chain (control lines not shown). In some embodiments, one or more of the receive diversity chains A-J has transmitter functionality and is a transceiver chain. The receive diversity chains A-J are coupled to the baseband processor 321 by signal lines 341A through 341J. The signal lines 341A through 341J represent analog IQ pairs (in-phase, quadrature) in some embodiments. In embodiments with ADC functionality in the receive diversity chains, or at least before the baseband processor 321, signal lines 341A-341J represent digital IQ pairs. The signals provided to the baseband processor 321 from one receive diversity chain may be referred to herein as diversity samples.

The primary transceiver chain 311 and signals associated with it are generally referred to as RX0. The signal referred to may be an RF signal associated with the primary antenna 301 or a receive baseband signal fed from the primary transceiver to the baseband processor at 346.

Operation

An example of the operation of the wireless circuitry 210 is as follows. Base station 103 sends, for example, a MIMO signal including two data streams and using 64 QAM modulation over the connection 121. Such a signal represents a rank two DL signal, for example, comprising two codewords.

Rank is a measure of independence. For example, consider base station 103 using two transmit antennas A and B to transmit a DL signal $(x_1, x_2)$ and the wireless device 102 using two receive antennas 301 and 302A to observe the DL signal $(y_1, y_2)$ after passage over the wireless link (or connection) 121. For simplicity of discussion, let $x_1, x_2, y_1,$ and $y_2$ be real variables. An expectation operator can be represented as $E\{\}$. The rank of the channel in this example is the rank of the two by two matrix R with elements $r_{ij}$ where $r_{11}=E\{x_1y_1\}$, $r_{12}=E\{x_1y_2\}$, $r_{21}=E\{x_2y_1\}$, and $r_{22}=E\{x_2y_2\}$, i is a row index and j is a column index. If the four radio propagation paths of interest (A to 301, A to 302A, B to 301, and B to 302A) fade independently, the rank of R will be two. If 301 and 302A are completely correlated antennas, the rank will be one. In general the rank of the wireless link 121 in this example will be a real number greater than one and less than two, varying with time and circumstances. Noise is neglected and the received DL signals are assumed to have energy greater than zero.

The control logic 322 enables diversity reception, assigning receive diversity chain J (312J), for example, to assist primary transceiver chain 311 in providing baseband samples to the baseband processor 321. The mapper 323 couples an antenna, for example, secondary antenna 302M to the receive diversity chain J. The receive diversity chain J processes signals observed on RF signal line 331J and provides IQ outputs (that are examples of diversity samples) on signal line 341J. The primary transceiver chain 311 processes signals observed on the primary antenna 301 and provides IQ signals on signal line 346 to the baseband processor 321. These primary IQ signals (or the corresponding RF signal on the primary antenna) may be referred to as RX0. The baseband processor 321 then applies signal processing techniques to the baseband samples arriving on 341J and 346 to recover the two data streams. The baseband processor, for example, performs a portion of the basebands 251 layer of FIG. 2B and in some embodiments, a portion of the MACs 261 layer of FIG. 2B. The recovered data, in some scenarios and after other processing reaches one or more of the applications represented as applications 281 in FIG. 2B. In another view of the same event, the processor 202 of FIG. 2A receives the data recovered by the baseband processor 321. The baseband processor 321 is within wireless circuitry 210 of FIG. 2A.

In some scenarios, the base station does not send a rank two DL signal. During a given codeword interval, only one codeword is sent. For further details on codewords, see the topic of layer mapping for spatial multiplexing in LTE 36.211. Under certain channel conditions, the baseband processor 321 does not need the baseband signals (that are examples of diversity samples) present on signal line 341J in order to recover the DL transmission with an acceptable error rate. In this case, the control logic, in some embodiments, powers down the receive diversity chain J (312J) to save power. Powering down means that the electric current flowing through the components of a given receive diversity chain are greatly reduced, and correspondingly, the discharge of the battery in the device 102 is reduced. Alternatively, although the baseband processor 321 does not need to observe the connection 121 via the receive diversity chain J (312J), the control logic 322, in some scenarios, gives the role of receiving a signal from another RAT to the receive diversity chain J (312J) and to one of the secondary antennas (302A-302M) that is mapped to the receive diversity chain J (312J). For example, the other RAT signal can correspond to a Wi-Fi signal from the AP 120 over the connection 122 or a Bluetooth® signal from the Bluetooth® device 130 over the connection 123.

Architecture Configuration and Components

Typically, transmissions from the wireless device 102 occur through the primary antenna 301. In some scenarios, the control logic configures one or more of the receive diversity chains for transmission and maps the output of the chain(s) (at one or more of the RF signal lines 331A through 331J) to one or more of the secondary antennas (one or more of 302A through 302M) through the mapper 323. The figure is schematic in nature, and not all components are shown. For example, RF combiners, phase lock loops, matching stages and other components are not shown.

A receive diversity chain includes a front end filter, a receive amplifier, and/or a conversion stage (for example, a mixer). A receive diversity chain, in some embodiments, includes an analog to digital converter (ADC). Transmit functionality includes a conversion stage (for example, a mixer), an RF filter, and/or a power amplifier. Transmit functionality, in some embodiments, includes a digital to analog converter (DAC). Other components, not shown in FIG. 3, are used in some embodiments to provide functionality. For example combiners, transmission lines, wideband filters, and diplexers are used in some embodiments, although not illustrated in FIG. 3. The receive diversity chains, in some embodiments, share an ADC. In some embodiments, one or more ADCs are present in the baseband processor 321.

Carrier Aggregation Aspects

The architecture of FIG. 3 and states of FIG. 5 (discussed below) are applicable in carrier aggregation scenarios. Carrier aggregation uses two or more contiguous carriers or non-contiguous carriers configured in spectrum blocks. The carriers are configured as primary component carriers (PCCs) and secondary component carriers (SCCs). For example, a PCC1 and an SCC1 may be assigned to provide DL signals to the wireless device 102. The control logic 322, can associate, for example, architecture components in the following configurations for the recovery of the DL information: Configuration A, and Configuration B.

Configuration A, shared chains: Primary transceiver chain 311 processes the PCC1 and SCC1 signals present on primary antenna 301 to provide baseband signals 346 while receive diversity chain A (312A), for example, mapped from secondary antenna 302A processes the PCC1 and SCC1 signals present on the secondary antenna 302A to provide baseband signals 341A. The baseband processor 321 recovers the data from PCC1 and SCC1 using the baseband signals 346 and the baseband signals 341A.

Configuration B, different diversity chains: Primary transceiver chain 311 processes the PCC1 and SCC1 signals present on primary antenna 301 to provide baseband signals 346 while receive diversity chain A (312A), for example, mapped from secondary antenna 302A processes the PCC1 signals present on the secondary antenna 302A to provide baseband signals 341A. Diversity chain J (312J) mapped from secondary antenna 302M, for example, processes the SCC1 signals present on the secondary antenna 302M to provide baseband signals 341J. The baseband processor 321 recovers the data from PCC1 and SCC1 using the baseband signals 346, the baseband signals 341A and the baseband signals 341J.

In a second scenario, downlink signals PCC1, SCC1 and SCC2 are present in the connection 121. The control logic 322, can associate, for example, architecture components in the following Configuration C for recovery of the information from these signals.

Configuration C, different diversity chains, two secondary component carriers: Primary transceiver chain 311 processes the PCC1, SCC1, and SCC2 signals present on primary antenna 301 to provide baseband signals 346 while receive diversity chain A (312A) mapped from secondary antenna 302A processes the PCC1 signals present on the secondary antenna 302A to provide baseband signals 341A. Diversity chain J (312J) mapped from secondary antenna 302M processes the SCC1 and SCC2 signals present on the secondary antenna 302M to provide baseband signals 341J. The baseband processor 321 recovers the data from PCC1, SCC1, and SCC2 using the baseband signals 346, the baseband signals 341A and the baseband signals 341J.

In some configurations, a single receive diversity chain is assigned to provide baseband samples corresponding to two or more SCCs. In some embodiments, proximity of two SCCs in carrier frequency and filter bandwidth characteristics of the single receive diversity chain support such a configuration.

Receive Diversity Chain and Power Tradeoffs

Figure 4A:
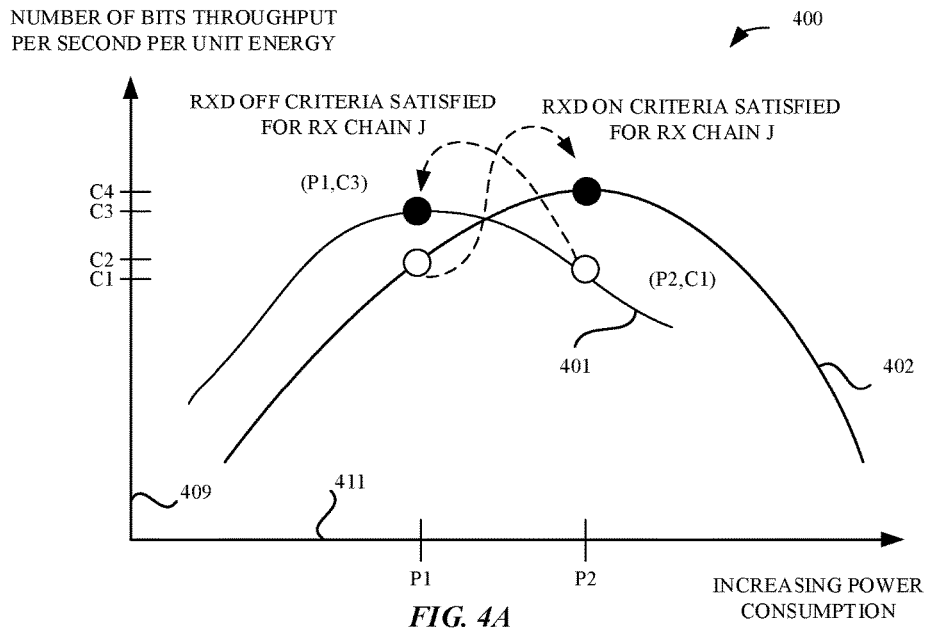
FIGS. 4A and 4B illustrate tradeoffs related to receive diversity chains, according to some embodiments.

FIG. 4A illustrates an example tradeoff with regard to control logic 322 employing a receive diversity chain at a given time to assist in providing diversity samples to the baseband processor 321 for recovery of a signal transmitted by the base station 103. For simplicity, the discussion here is with respect to the base station 103, but this is not limiting. A diversity chain, in some embodiments, is used to demodulate a signal from another base station, for example, base station 104. In a sense, FIG. 4A represents part of an operating space of wireless circuitry 210. Axes 409 and 411 represent a throughput efficiency measure and an energy measure, respectively. For example, axis 409, in some embodiments, represents a number of bits throughput per second per unit energy expended (energy expended by the device 102). Points C1, C2, C3, and C4 are marked on axis 409. Axis 411 provides the qualitative notion of increasing power consumption with two values marked, P1 and P2, with P2>P1. Axis 411 represents nominal instantaneous power consumption of wireless circuitry 210. Two curves are shown, curve 401 and curve 402. These curves correspond to different channel conditions. That is, curve 401 and curve 402 are not simultaneously applicable. They represent two different examples. The figure is annotated with the expression "RXD . . . CRITERIA." This note refers to criteria, in some embodiments, input to or determined by the control logic 322. The criteria are examined to determine whether a given receive diversity chain should be used to provide diversity samples to the baseband processor 321.

For example, curve 401 represents a tradeoff between throughput efficiency measure and increasing power consumption in the device 102. Initially, the device 102 is operating at the open bubble point (P2,C1). This point is not the most efficient point. Another point is available, that is (P1,C3), C3>C1 and P1<P2. The dashed line marked "RXD OFF CRITERIA SATISFIED" illustrates that throughput efficiency is increased by powering down, for example, receive diversity chain J (indicated as "RX CHAIN J" in FIG. 4A) and moving to the point marked with a closed bubble (P1, C3). Axis 409 is an efficiency measure, that is, it is normalized by energy; C3>C1 does not indicate that the throughput increases after turning off receive diversity chain J to arrive at the point (P1, C3). C3>C1 indicates throughput efficiency has increased; P1<P2 indicates that nominal instantaneous power consumption has decreased. Under different channel conditions, curve 402 represents the operating space of the wireless circuitry 210 with respect to using a receive diversity chain for demodulating a signal from the base station 103. Under other conditions, moving from a state with no diversity samples to providing diversity samples represents an increase in throughput efficiency. Such a move is shown by a dashed arrow annotated "RXD ON CRITERIA SATISFIED." Because this operating space depends on many variables, many curves are possible, and frequent observations of channel conditions can lead to improving throughput efficiency during a session over the connection 121.

Figure 4B:
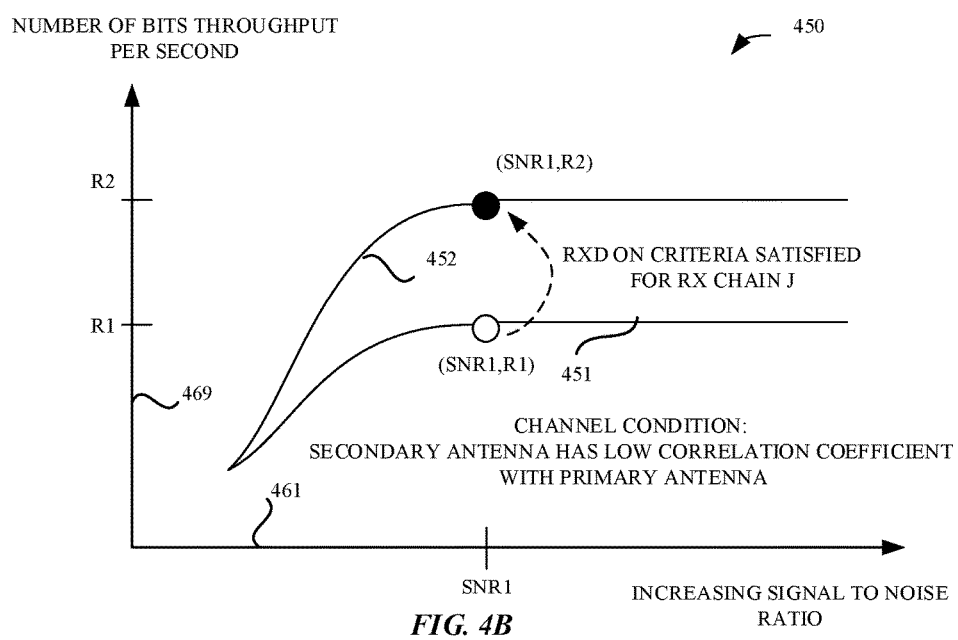

FIG. 4B provides further illustration of the effect of going from a state of no diversity samples to providing diversity samples. Axes 469 and 461 are a throughput measure and a signal to noise ratio measure, respectively. Curves 451 and 452 represent the same channel conditions, with the exception possibly, of the nature of the signal transmitted by the base station 103. An antenna aspect of channel conditions is annotated on the figure: "LOW CORRELATION COEFFICIENT." Curve 451 illustrates that initially, as signal to noise ratio increases, throughput increases under a given set of channel conditions. Travelling along curve 451 can also represent modulation and coding scheme (MCS) changes, not shown. Eventually, at about the abscissa value SNR1, further increases in signal to noise ratio do not increase throughput, that is, curve 451 levels off at a value denoted R1. This point is marked with an open bubble at point (SNR1, R1). A move from curve 451 to curve 452 at the signal to noise ratio point of SNR1 will move the throughput from R1 to R2 where R2>R1. This increase is available because diversity samples, for example, allow the base station 103 to transmit a more complex signal. Examples of a more complex signal are a higher order QAM constellation (for example changing from 16 QAM to 64 QAM) or transmitting an additional MIMO layer such as by adding a second codeword.

Receive Diversity Chain State

Figure 5:
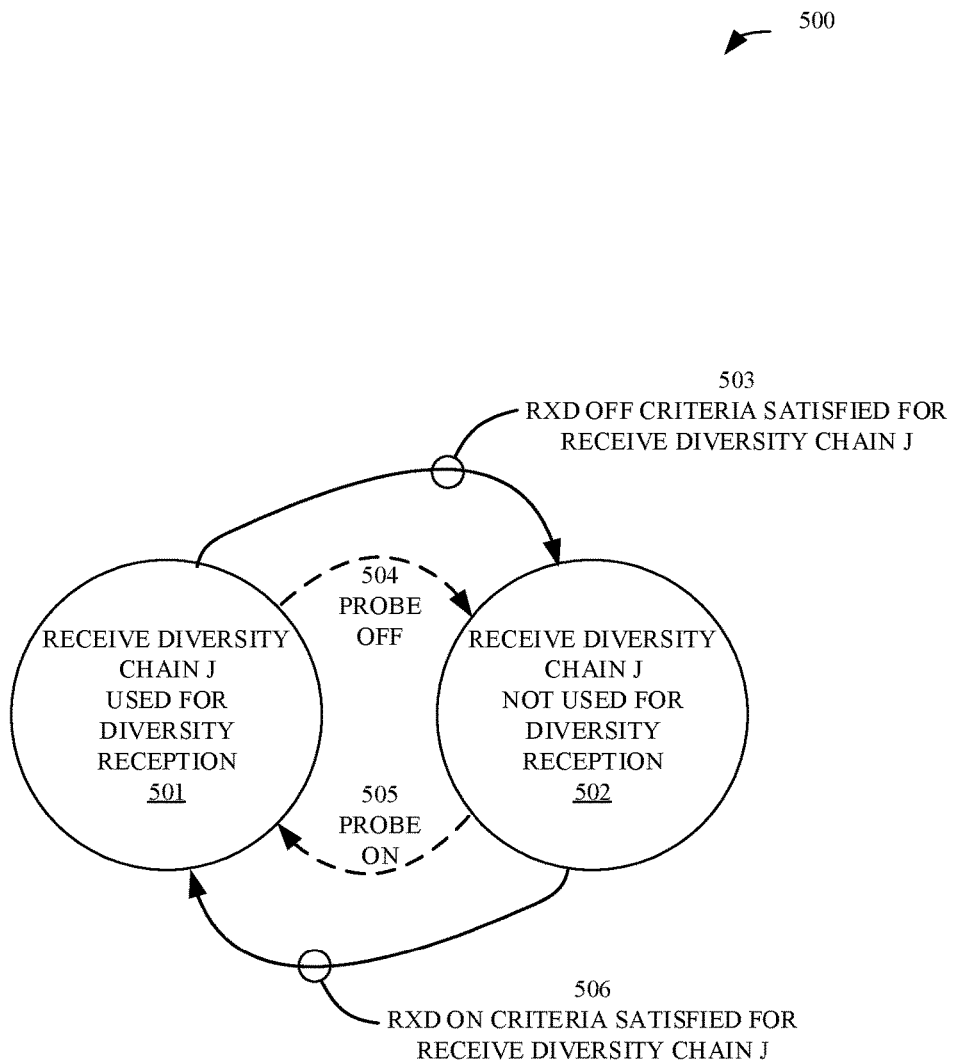
FIG. 5 illustrates an exemplary state diagram of a receive diversity chain, according to some embodiments.

FIG. 5 illustrates a state of diversity chain determined by the control logic 322. At state 501, receive diversity chain J (J is an example) is used to provide diversity samples for diversity reception to the baseband processor 321. A transition 503 from state 501 (denoted in the figure "503 RXD OFF CRITERIA SATISFIED") results in receive diversity chain J no longer providing diversity samples to be used with the baseband samples 346 to recover a downlink signal from the base station 103. Transition 503 thus terminates at state 502. Receive diversity chain J in state 502 is powered-down in some embodiments. In some embodiments, receive diversity chain J in state 502 is assigned to provide baseband samples corresponding to a different RAT. Subsequently, channel conditions may change or the behavior of the base station 103 may change. A transition 506 (denoted "506 RXD ON CRITERIA SATISFIED") illustrates the state of receive diversity changing from 502 to 501; in state 501 receive diversity chain J again provides diversity samples corresponding to the link 121. Criteria for transitions 503 and 506 will be discussed further below, for example, with regards to FIGS. 8A-8C and 9A-9C.

Transitions 505 ("PROBE ON") and 504 ("PROBE OFF") mark the beginning and ending of a diversity probing period. A diversity probing period is used, in some embodiments, to establish fresh CQI and channel rank values using a secondary antenna 302 along with the primary antenna 301. Measurements made with more than one antenna may be referred to as higher order measurements. In some embodiments, the fresh values are reported to the base station 103. Probing will be discussed further in the discussion of FIG. 6.

Probing the Wireless Channel

Figure 6:
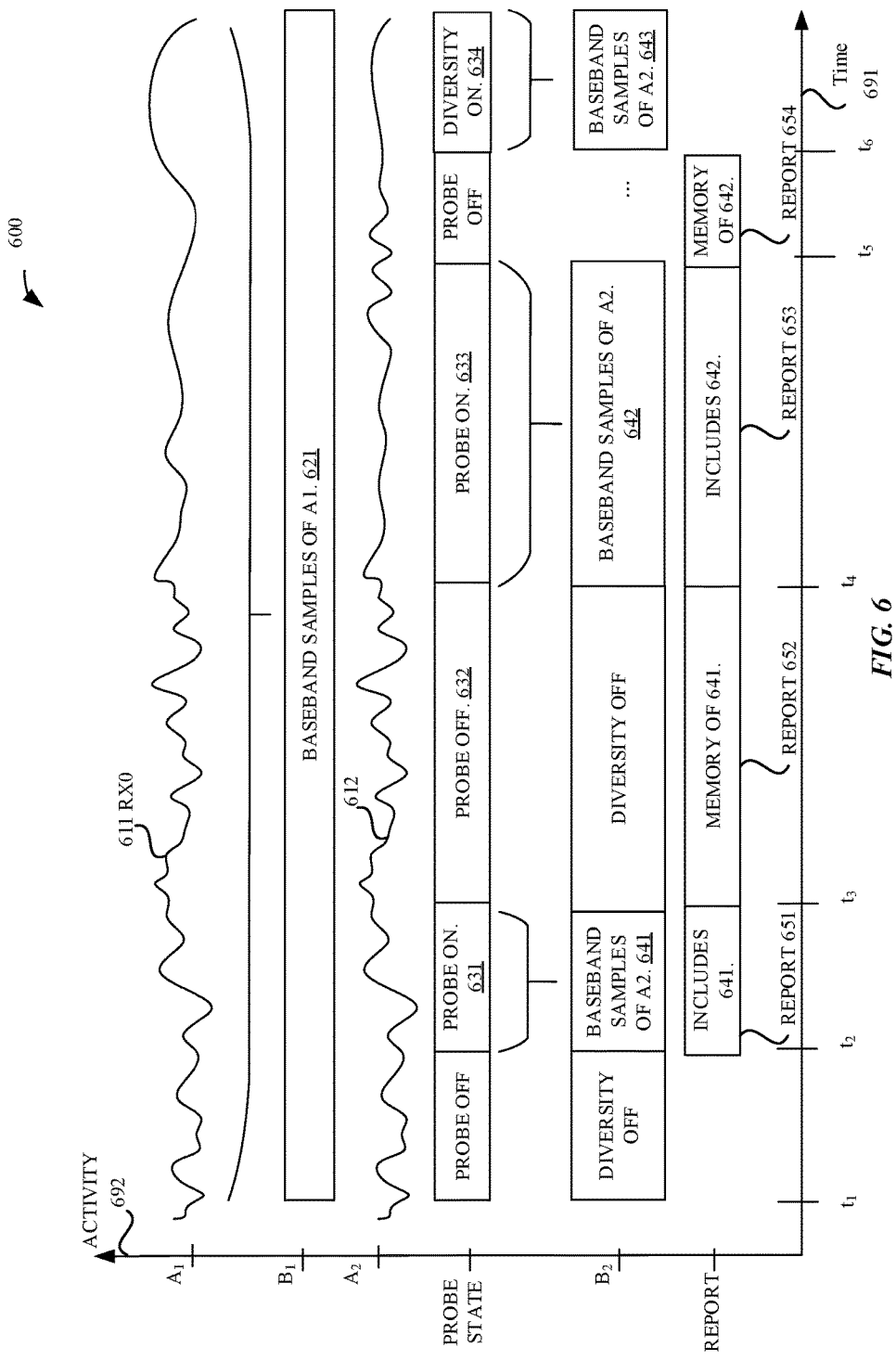
FIG. 6 illustrates exemplary waveforms and activities related to using a receive diversity chain for probing a wireless link, according to some embodiments.

When the baseband processor 321 does not have access to diversity samples, it is unable to fully measure CQI and channel rank. If the block error rate or other channel degradation events indicate that diversity samples should be obtained, then a transition 506 will be made to state 501 (in general enabling some receive diversity chain A . . . J) and diversity samples will be obtained. However, in some instances an event triggering transition 506 does not occur, and channel information at the device 102 becomes of diminishing value with respect to characteristics that can only be measured with two or more antennas. A diversity probing period addresses this issue. FIG. 6 illustrates diversity probing details. FIG. 6 presents an activity axis 692 and a time axis 691. The activity axis 692 includes an ordinal value $A_1$ for a waveform representation 611 of a signal on primary antenna 301 (this signal may be referred to as RX0). The waveforms in FIG. 6 are schematic in nature, details of carrier frequency, modulation format, and complex number representation (IQ) are not shown. A baseband representation of these samples provided by primary transceiver chain 311 on signal line 346 is represented as 621. Activity $A_2$ is a waveform representation 612 of a signal on a secondary antenna 302. Activity PROBE STATE indicates when a transition 505 has occurred so that diversity samples are obtained and higher order measurements are made. The PROBE STATE is indicated as PROBE OFF (in state 502), PROBE ON (reaching state 502 via transition 505) and DIVERSITY ON (reaching state 502 via transition 506).

A PROBE ON event, period, or activity, in some embodiments, is triggered by a measurement of 611 RX0 that indicates a high SNR value. The high SNR value can indicate that a sufficient gain in throughput is available to justify supplying power to a receive diversity chain and possibly a change of modulation format at the base station. To obtain a fresh higher order measurement to send to the base station, a diversity probing period is used, as indicated, for example by the PROBE ON events 631 and 633. Activity $B_2$ represents baseband samples arriving at the baseband processor 321 from a receive diversity chain. At times $t_2$, $t_4$ and $t_6$ of time axis 692, baseband samples of the secondary antenna arrive via a receive diversity chain at the baseband processor 321. Diversity samples during PROBE ON events 631 and 633 are represented at ordinal value B2 as reference numerals 641 and 642, respectively. In exemplary FIG. 6, the secondary antenna waveform 612 is highly correlated with the waveform 611 RX0 from time $t_1$ to time $t_4$. Such a waveform does not provide a significant benefit for demodulation to the baseband processor 321 because, for example, both waveforms experience channel fades at the same time. Beginning at time $t_4$, the waveforms are statistically unrelated.

In some embodiments, PROBE ON events are periodic. The frequency of the PROBE ON events, in some embodiments, is related to the rate at which measured statistics of 611 RX0 (or baseband 621) change. A random variable with a variance which changes with time is non-stationary. In general, the statistics of baseband samples 621 are non-stationary. A time between substantial changes in those statistics, in some embodiments, is used to indicate that a PROBE ON period should be triggered. In some embodiments, PROBE ON events are periodic with a pre-determined period independent of the statistics of waveform 611 RX0 (and so independent also of baseband samples 621).

The behavior of the wireless device 102 in reporting channel conditions describing the connection 121 to the base station 103, in some embodiments, is as follows. During the time $t_2$ to $t_3$, the wireless device 102 sends a report 651 based on information 641 (and based on 611 RX0 represented as 621 for the applicable time). During this time epoch, the secondary antenna does not exhibit a low correlation with the primary antenna. The reported channel rank is probably close to one (indicating no diversity reception in a statistical sense is occurring, although SNR benefits will exist). The base station is unlikely, for example, to add an additional MIMO transmission layer or codeword in response to report 651. During the interval $t_3$ to $t_4$, the wireless device 102 does not have access to higher order measurements. In report 652, the wireless device repeats CQI and channel rank measurements obtained during the PROBE ON period 631. This repetition is indicated with the annotation MEMORY OF 641 in FIG. 6. At time $t_4$, a transition 505 causes a PROBE ON event 633. Report 653 is based on corresponding samples from 621 and 642 for the time $t_4$ to $t_5$ (a precise timing of the report is not shown). Because the secondary antenna exhibits a low correlation with the primary antenna, the channel rank and CQI information in the report 653 may contribute to the base station 103 increasing the modulation order or number of codewords sent to the wireless device 102. At $t_5$, the receive diversity chain state of the given diversity chain returns to state 502. Report 654 provides a report with measurement continuity or repetition (shown as based on MEMORY OF 642 in FIG. 6). At a time $t_6$, a 506 transition to state 501 occurs as indicated by the annotation DIVERSITY ON 634. Diversity samples are presented to the baseband processor (indicated by 643 in FIG. 6). The measurement continuity (e.g., MEMORY OF 642 in FIG. 6), in some embodiments, is provided using a filtered value (such as using a one pole IIR filter as described below with respect to transitions 503 and 506). The inverse bandwidth or time constant of the filter, in some embodiments, corresponds to the expected validity of the last measurement.

Probe duration and periodicity in some embodiments, depends on RX0 RSRP, RX0 SNR, and/or current average UL or DL scheduling grant rates.

Logic

Figure 7A:
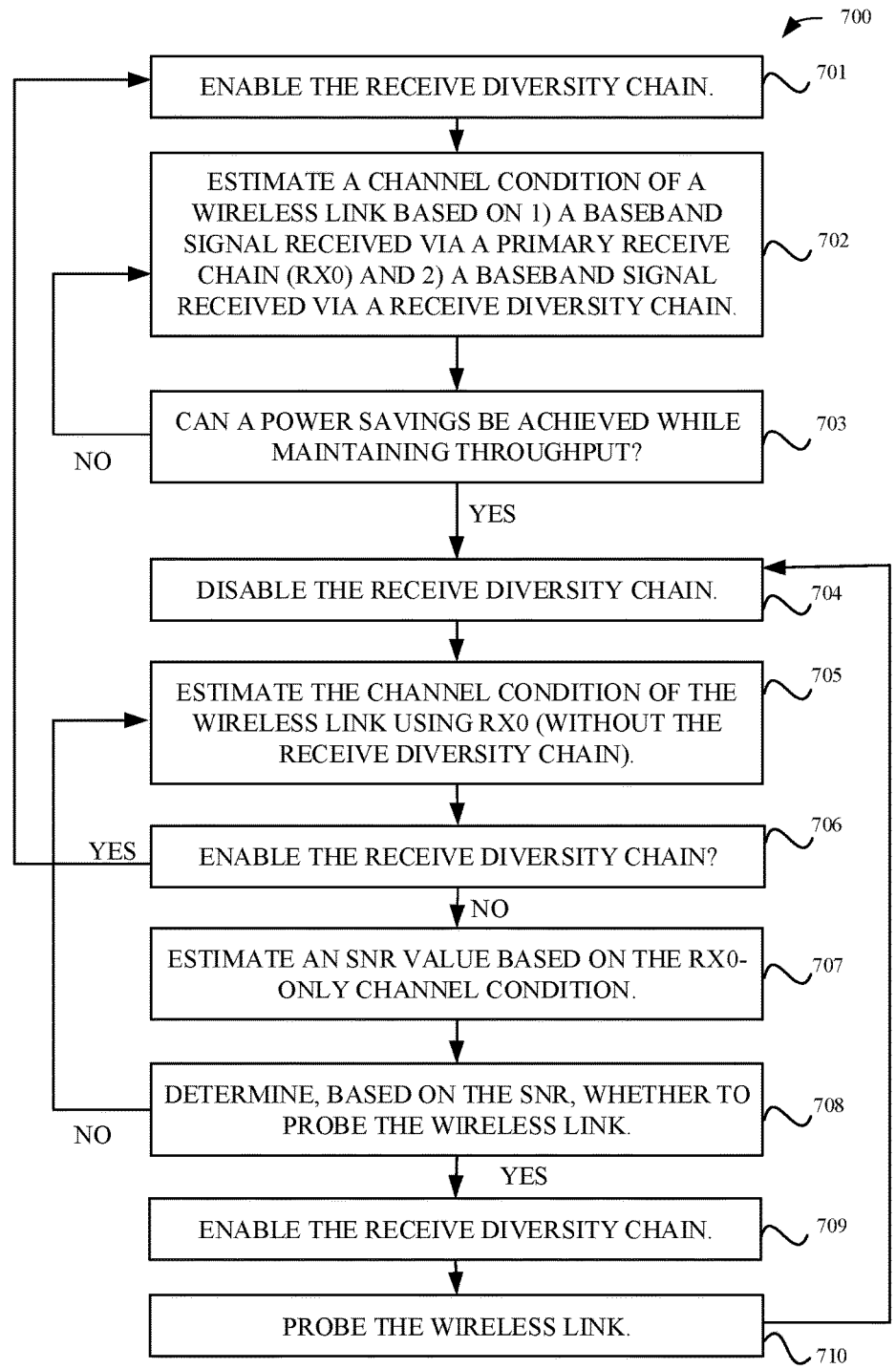
FIGS. 7A and 7B each illustrate exemplary logic related to using a receive diversity chain for probing a wireless link, according to some embodiments.

FIG. 7A illustrates logic 700 for managing use of a receive diversity chain as illustrated and described with respect to FIGS. 1-6. At 701, a receive diversity chain of a device is enabled to provide diversity samples. At 702, the device estimates a channel condition of a wireless link based on i) a baseband signal received via a primary receive chain (RX0) and ii) a baseband signal received via the receive diversity chain providing the diversity samples. During 702, data transmission and reception also occur, not shown. At 703, the device determines, based on the estimated channel condition, whether a power savings can be achieved which maintaining throughput. If not, the logic flow returns to 702. If yes, the logic flows to 704. At 704, the device disables the receive diversity chain that was in use. At 705, the device estimates a channel condition using RX0 without the receive diversity chain. At 706, based on the estimated channel condition using RX0, the device determines whether a receive diversity chain should be enabled. If yes, the logic flows to 701. If no, the logic flows to 707. At 707, the device estimates an SNR value based on the RX0-only channel condition estimated at 705. At 708, the device determines whether to probe the wireless link. If no, the logic flows to 705. If yes, the logic flows to 709 where the receive diversity chain is enabled. At 710, the wireless channel is probed using RX0 and the receive diversity chain. The logic then flows to 704.

Figure 7B:
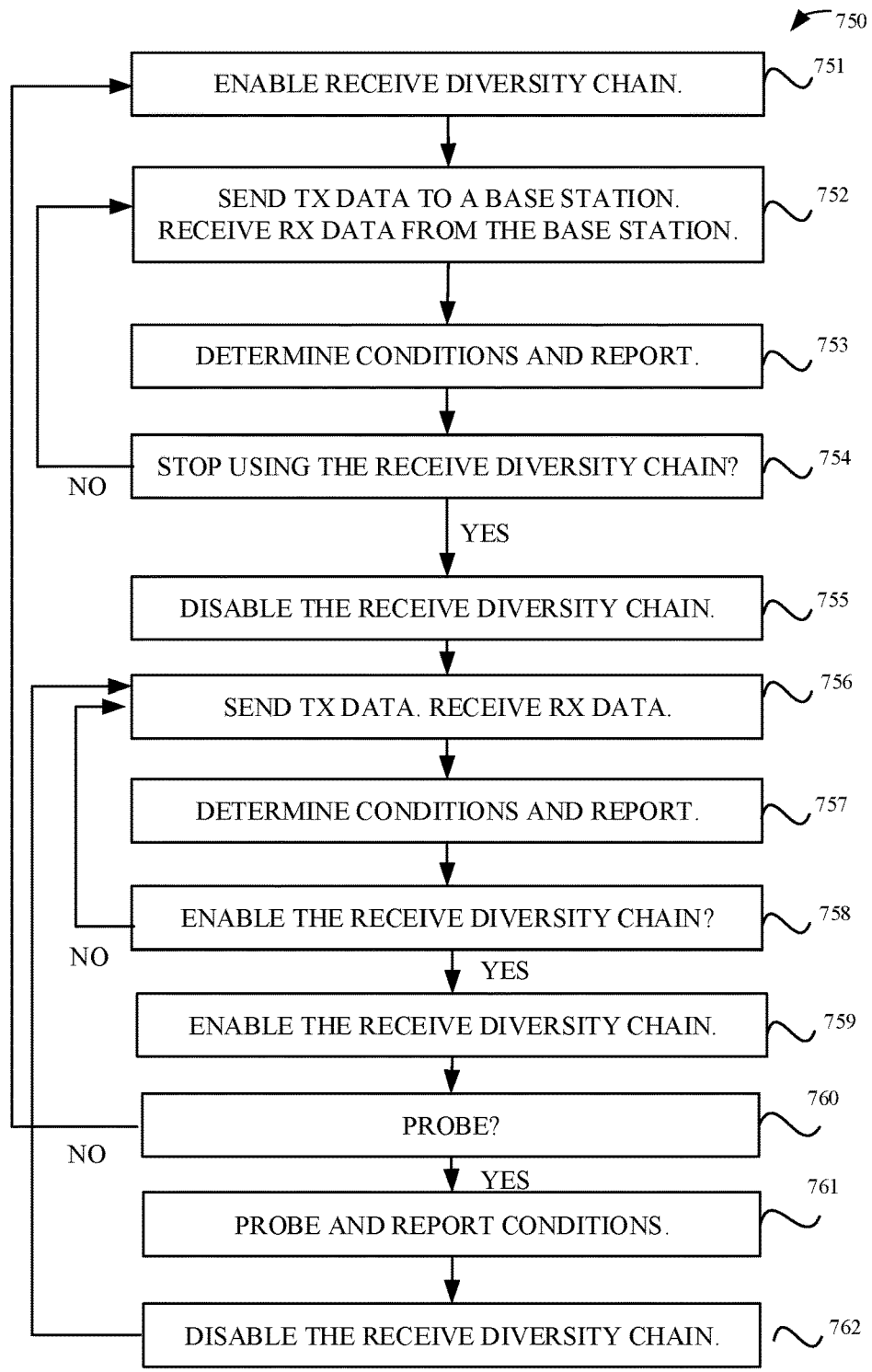

FIG. 7B illustrates logic also applicable to the devices, events and techniques of FIGS. 1-6. At 751, a device enables a receive diversity chain. At 752, the device sends transmit (TX) data to a base station and receives receive (RX) data from the base station. At 753, the device determines the condition of a wireless link and reports the condition to the base station. The base station may adjust modulation format or number of MIMO streams based on any report. At 754, the device determines whether to disable a receive diversity chain. If the decision is to not disable, the logic flows to 752. If the decision is to disable, the logic flows to 755 where the receive diversity chain is disabled. At 756 the device sends TX data and receives RX data to and from the base station. At 757, the device determines channel conditions and reports to the base station. At 758, the device determines whether to enable the receive diversity chain. This decision can lead to transition 505 or 506. If no, the logic flows 756. If yes, the logic flows to 759. At 759 the transitions 505 and 506 are distinguished. If a probe is to take place, the logic flows to 761. If not, the logic flows to 751. At 761, the device probes the wireless link and reports conditions to the base station. Because it was a probe event, at 762, the logic then disables the receive diversity chain and flows to 756.

Use of Receive Diversity Chains and Channel Conditions

ARD includes algorithms for toggling the state of a given UE receive diversity chain between using the chain for diversity reception (state 501 of FIG. 5) and not using the receive diversity chain for diversity reception (state 502 of FIG. 5). A given wireless device, in some embodiments, includes two or more receive diversity chains as shown in FIG. 3. A given receive diversity chain, in some embodiments, includes a transmit chain and so can perform as a transceiver chain. The wireless devices disclosed herein include two or more physical antennas, shown with reference numerals 302A through 302M in FIG. 3. In some embodiments, the primary antenna 301 is physically connected to the primary transceiver chain 311. The primary transceiver chain 311 accepts as input radio frequency (RF) band signals from the primary antenna 301 and provides as output baseband signals 346 to the baseband processor 321. Transmit signals are processed by the primary transceiver chain 311 in the reverse direction. Like the primary transceiver chain and the primary antenna, the receive diversity chains accept RF signals from the secondary antennas and provide corresponding baseband signals 341 to the baseband processor 321. In some embodiments, there are two or more baseband processors 321.

Decision criteria are disclosed herein for moving between states 501 and 502. The criteria include the amount of energy needed to convey a given amount of data (power savings), a rate at which data is conveyed, and performance measures such as BLER. In some embodiments, various variables are considered to determine whether a given receive diversity chain should be employed. In some embodiments, a decision is made as to whether a receive diversity chain should be provided with battery power so that the receive diversity chain can improve reception of data present in an LTE DL signal received from base station 103, for example (reduce BLER). In some embodiments, the receive diversity chain is no longer focused on an LTE DL signal of connection 121, but instead is employed to recover a signal associated with another RAT, such as Bluetooth® (connection 123) or Wi-Fi (connection 122). In some scenarios, a receive diversity chain that was in use to demodulate a signal received over connection 123 or 122, but which is no longer needed for the other RAT, is applied to provide diversity samples to assist in demodulating the DL signal of connection 121.

Criteria

Radio signals propagate between a wireless device and a base station via various paths, and reception is subject to various levels of noise and interference. At the wireless device receiver, fewer bits of error-free data can be recovered the weaker the desired DL signal is, the stronger an additive noise or interference is, and the lower diversity order of the DL signal that the wireless device has. Statistics and measurements useful for determining whether a state transition such as 503, 504, 505, or 505 should take place include SNR, CQI, channel state information CSI, channel rank, UE transmit power, reference received signal power (RSRP), BLER, RACH failures (see FIG. 8A), SR failures (see FIG. 8B), RLC failures (see FIG. 8C), activity of DL and UL scheduling grants (see FIG. 9A), number of codewords in use by the base station (see FIG. 9B), MCS allocation, and antenna correlation measurements (see FIG. 9C). During critical ongoing procedures, a receive diversity chain does not transition to RxD OFF state (502). Critical ongoing procedures are ongoing if a tested moment in time includes: i) a modem sleep interval, ii) an assigned measurement time gap, iii) a handover procedure, iv) a tuneaway to measure another RAT, v) a search or a measurement for base stations other than base station 103, and/or vi) carrier aggregation activity.

The ARD algorithm, in some embodiments, is applied in both connected mode and in idle mode page decoding wake up periods. These modes are controlled by the radio resource control (RRC) of the LTE MAC present in MACs 261 of wireless device 102.

By considering the various measurements and statistics described above, embodiments disclosed herein provide techniques for determining whether a given receive diversity chain should be used for diversity reception.

Decision Evaluation

The decision based on the criteria including the various measurements and statistics described above of whether to transition from a state (FIG. 5) of each receive diversity chain 312A through 312J, in some embodiments, is made independently between receive diversity chains. In some embodiments, the decision is made jointly for two or more receive diversity chains. In carrier aggregation (CA) scenarios, the criteria including the measurements and statistics are also evaluated. In some embodiments, the criteria are evaluated independently for each assigned component carrier. In some embodiments, the criteria are evaluated jointly for two or more assigned component carriers. In some embodiments, the criteria are evaluated jointly for all assigned component carriers.

ARD Technique, RXD On to RXD Off, Transition 503

As described above DL signals from the base station 103 over the wireless link can be demodulated, with varying success with or without a receive diversity chain. This section, discussing transition 503, generally uses measures and statistics obtained using the primary transceiver chain 311 (corresponding to the signal referred to as RX0) and diversity signals from a receive diversity chain. Specific reliance on RX0 occurs for those measures where RX0 is specifically mentioned. The filtered transmit power discussed below does not rely directly on a receiver chain.

Channel Quality Thresholds, Transition 503

In order to transition to state 502 (receive diversity chain not used), the measurements described above can be compared based on three inequalities: i) compare a filtered RSRP on RX0 with an RSRP threshold, ii) compare a filtered SNR on RX0 with an SNR threshold, and iii) compare a filtered transmit power of the UE 102 with a transmit power threshold. In some embodiments, transition 503 will not occur unless a channel quality Boolean decision value is true, where the channel quality Boolean decision value is true when all or a subset of the following conditions are satisfied: i) the filtered RSRP on RX0 exceeds the RSRP threshold, ii) the filtered SNR on RX0 exceeds the SNR threshold, and iii) the filtered transmit power of the UE 102 is below the transmit power threshold.

Filtering, in some embodiments, is performed with a one pole infinite impulse response (IIR) filter of the form y[n+1]=bx[n+1]+(1−b)y[n], where y is the filter output and x is the filter input, and b is a number between 0 and 1. For example, the filtered RSRP value can be obtained by supplying measurements of RSRP to the one pole filter as x and updating the filter to obtain a current filtered RSRP value as y. Alternatively, a moving average filter with uniform tap gains is used, in some embodiments. Filters of one of these kinds, in some embodiments, are maintained for each of the filtered signals described (RSRP, SNR, and transmit power).

Scheduling and Performance Thresholds, Transition 503

In order to transition to state 502 (receive diversity chain not used), the measurements described above can be compared based on threshold comparisons performed after certain evaluation time intervals: interval_1 and interval_2.

One technique is as follows. Initialize rate estimates to zero (e.g., assign DL BLER=0) and then run a counter and determine when a time interval_1 has elapsed. The interval_1 value, in some embodiments is in the range 100 to 200 ms (milliseconds). When the interval_1 has elapsed, perform an evaluation and denote this an evaluation period. The evaluation includes checking one or more of the following inequalities: i) compare an averaged DL scheduling rate with a scheduling rate threshold, ii) compare the DL BLER with a DL BLER threshold, iii) compare an antenna correlation coefficient with a correlation threshold and iv) compare a percentage of rank two DL traffic with a rank two threshold. In some embodiments, a first scheduling Boolean decision value is true when all or a subset of the following conditions are satisfied i) the averaged DL scheduling rate is below the scheduling rate threshold, ii) the DL BLER is below the DL BLER threshold, iii) the antenna correlation coefficient exceeds the correlation threshold, and iv) the percentage of rank two DL traffic is below the rank two threshold. If the applicable DL transmission mode is a rank one mode, then percentage of rank two traffic is not evaluated, in some embodiments, or that particular inequality is taken to be true (true: the percentage of rank two DL traffic is below the rank two threshold). If the first scheduling Boolean decision value is true, then, in some embodiments, the transition 503 occurs (no longer use the receive diversity chain).

A second evaluation period is based on interval_2 and occurs in parallel with the interval_1-based evaluation. A technique is as follows. Run a second counter and determine when a time interval_2 has elapsed. The interval_2 value, in some embodiments, is in the range of approximately 20 to 50 ms. When the interval_2 has elapsed, perform a second evaluation and denote this a parallel evaluation period. The second evaluation determines whether there is any DL scheduling activity during an interval of duration interval_2. In some embodiments, a second scheduling Boolean decision value is true when there is no DL scheduling activity during the parallel evaluation period. If the second scheduling Boolean decision value is true, then, in some embodiments, the transition 503 to not use the receive diversity chain is made. In effect, in some embodiments a logical OR operation is taken between the first scheduling Boolean decision value and the second scheduling Boolean decision value to provide a third scheduling Boolean decision value.

In some embodiments, interval_1>interval_2. In some embodiments, interval_2 is adapted as time advances based on learned inter-arrival time of scheduling grants during a recent previous connection or a current connection. Interval_2, in some embodiments, is adjusted based on the success or failure of previously received grants. For example, when a cyclic redundancy check (CRC) failure occurs, interval_2 can be increased, for example, by 10 ms, to capture diversity samples (not take transition 503) of a given retransmission grant which would otherwise fall outside of the parallel evaluation period. This increase can be referred to as backing off, or backing off the moment at which the receive diversity chain will stop being used. Without the backoff, i) the given retransmission grant will often fall outside of the parallel evaluation period, ii) the second scheduling Boolean decision value may be true, iii) the transition 503 will occur, iv) the given retransmission grant will be received without diversity samples, and finally v) the grant may be decoded erroneously due to difficult channel conditions. In other words, during retransmission scenarios, interval_2, in some embodiments, is increased to provide additional link margin or decoding robustness. Increasing decoding robustness refers to a higher success rate of recovering error free bits corresponding to a DL transmission from the base station 103 over the wireless link 121.

Satisfactory operation of the wireless device 102 includes receiving periodic messages from the base station 103. If a DL BLER with respect to expected messages is high, or recent DL blocks have decoded in error, in some embodiments the current value of interval_2 value is increased, in some embodiments, to bias operation of the wireless circuitry 210 toward employing one or more receive diversity chains.

In some embodiments, interval_2 is adapted based on the nature of applications executing (applications 281). For example, a foreground application is one in which a user has the display screen of the wireless device 102 on or energized, such as for browsing the Internet or using a social media application. Inter-arrival times of scheduling grants depend on traffic class (a MAC characteristic). In some embodiments, the value of interval_2 is based on traffic class. Traffic class information is available to control logic 322 from MACs 261. For example, in some embodiments, the value of interval_2 is longer during foreground traffic than a value of interval_2 used for background (for example, periodic email update by a server) traffic.

Connection Thresholds, Transition 503

A connection Boolean decision value, in some embodiments, is determined as follows. At any time, if i) a number of consecutive failed RACH attempts is below a RACH threshold, ii) a number of consecutive failed SR requests is below an SR threshold, and iii) a number of UL RLC retransmission attempts is below an RLC threshold, then the connection Boolean decision value is true.

Critical Procedures, Transition 503

A procedure Boolean decision value, in some embodiments, is determined as follows. The procedure Boolean decision value is true if there are no critical procedures on going.

The ARD technique, in some embodiments, is not invoked to cause a transition to RXD off in certain situations. Examples of those situations are a measurement gap is configured by the network to which the base station 103 belongs, the wireless device 102 is performing inter-RAT (IRAT) search or measurements, the wireless device 102 is performing SCC search or measurements, procedures that require RF tuning such as SCC addition or SCC deletion.

Processing the Decision Values, Transition 503 ("RXD On to RXD Off")

In some embodiments, the transition 503 occurs (RXD Off criteria are met) if all of the following Boolean decision values are true: the first channel quality Boolean decision value, the third scheduling Boolean decision value, the connection Boolean decision value, and the procedure Boolean decision value. In some embodiments, the transition 503 occurs if either of the following are true: the first channel quality Boolean decision value or the third scheduling Boolean decision value.

ARD Technique, RXD Off to RXD On, Transition 506

This section, discussing transition 506, generally uses measures and statistics obtained using the primary transceiver chain 311 only (corresponding to the signal referred to as RX0). Exceptions are the filtered transmit power and the antenna correlation coefficient statistics.

Channel Quality Thresholds, Transition 506

This section, discussing transition 503, generally uses measures and statistics obtained using the primary transceiver chain 311 (signal referred to as RX0) and diversity signals from a receive diversity chain. Specific reliance on RX0 occurs in those measures where RX0 is specifically mentioned.

In order to transition to state 501 (receive diversity chain used), the measurements described above can be compared based on three inequalities: i) determine if the filtered RSRP on RX0 is below a second RSRP threshold, ii) determine if the filtered SNR on RX0 is below a second SNR threshold, and iii) determine if the filtered transmit power of the UE 102 exceeds a second transmit power threshold. In some embodiments, transition 506 will occur if any of these inequalities is true. That is, control logic 322 will direct transition 506 to occur if i) the filtered RSRP on RX0 is less than the second RSRP threshold, ii) the filtered SNR on RX0 is less than the second SNR threshold, or iii) the filtered transmit power of the UE 102 exceeds the second transmit power threshold.

Filtering, in some embodiments, is performed as described with respect to transition 503 above. The second thresholds described with respect to "channel quality thresholds, transition 506" provide hysteresis applied in conjunction with the thresholds described with respect to "channel quality thresholds, transition 503." That is the second RSRP threshold is less than the RSRP threshold, the second SNR threshold is less than the SNR threshold, and the second transmit power threshold is less than the transmit power threshold.

Scheduling and Performance Thresholds, Transition 506

In order to transition to state 501 (receive diversity chain in use), the measurements described above can be compared based on threshold comparisons performed with an evaluation time interval: interval_3. A technique is as follows. Initialize rate estimates to zero (e.g., assign DL BLER=0) and then run a counter and determine when a time interval_3 has elapsed. The interval_3 value, in some embodiments, is in the range 20 to 60 ms. The evaluation includes a check on one or more of the following inequalities: i) compare a short term DL scheduling rate with a short term scheduling rate threshold, ii) compare a short term UL scheduling rate with the short term scheduling rate threshold, and iii) compare a short term DL BLER with a short term DL BLER threshold. For example, if the short term scheduling rate threshold is 0.1, the frequency of possible grants is one per ms, and two DL or UL grants are received in 20 ms, then the short term scheduling rate threshold inequality has been satisfied and the data in this example indicates that transition 506 should occur promptly, without awaiting the completion of interval_3. Similarly if the short term DL BLER threshold is satisfied before the completion of the time interval_3, the transition 506 should occur promptly.

If any of the following events has occurred during the time interval_3 then the transition 506 should occur: i) a DL burst was detected, ii) a DL CRC failure burst occurred, iii) an UL burst occurred, or iv) a high MCS (e.g., 64 QAM modulation) DL transmission was detected. In some embodiments, a high MCS is declared by comparing an observed MCS index, $I_{MCS}$, with an MCS index threshold, $Th_{MCS}$. For example, if $Th_{MCS}=16$ and $I_{MCS}$ is detected to be 17, then a high MCS is indicated and a transition to 506 will occur. Alternatively, an observed modulation order Q. is compared with a modulation order threshold, $Th_Q$, in some embodiments. For example, if a modulation threshold is in use and $Th_Q=4$ (corresponding to 16 QAM) and $Q_m=6$ (corresponding to 64 QAM) is detected, then a high MCS is indicated and a transition to 506 will occur. Further description of the terms MCS index and modulation order can be found in LTE 36.213. Observations, in some embodiments, are filtered (linearly or nonlinearly) before comparing with a threshold. An example of a linear filter is the one pole IIR filter discussed above. An example of a nonlinear filter is a filter which performs a maximum operation on filter inputs during the time interval_3, for example. In another alternative a high MCS is detected, in some embodiments, if the following inequality is satisfied: (the larger of the MCS values detected on first and second codewords) is greater than an MCS threshold for a target number of grants during the interval_3 time period. The target number of grants is interval_3 times the short term scheduling threshold divided by 100. Here, interval_3 is given in ms and the short term scheduling threshold is a percentage between 0 and 100.

Connection Thresholds, Transition 506

At any time, if i) a number of consecutive failed RACH attempts is above a second RACH threshold, ii) a number of consecutive failed SR requests is above a second SR threshold, or iii) a number of UL RLC retransmission attempts is above a second RLC threshold, then a transition 506, in some embodiments, will be directed by the control logic 322. The second RACH threshold, the second SR threshold, and the second RLC threshold provide hysteresis with respect to the transition 503 thresholds (RACH threshold, SR threshold, and RLC threshold, respectively). This means that the second RACH threshold is greater than the RACH threshold, the second SR threshold is greater than the SR threshold, and the second RLC threshold is greater than the RLC threshold.

Critical Procedures, Transition 506

If any critical procedure is commencing, transition 506 occurs.

Invoking Transition 506 ("RXD Off to RXD On")

The ARD technique for transitioning to use of a receive diversity chain is of a logical "OR" nature, occurrence of the various events described above, in some embodiments, individually cause transition 506 to occur and commencement of use of the respective receive diversity chain.

Illustration of Selected Measurements and Statistics used as Criteria

FIGS. 8A, 8B, 8C, 9A, 9B, and 9C illustrate selected measurements and statistics described above.

Figure 8A:
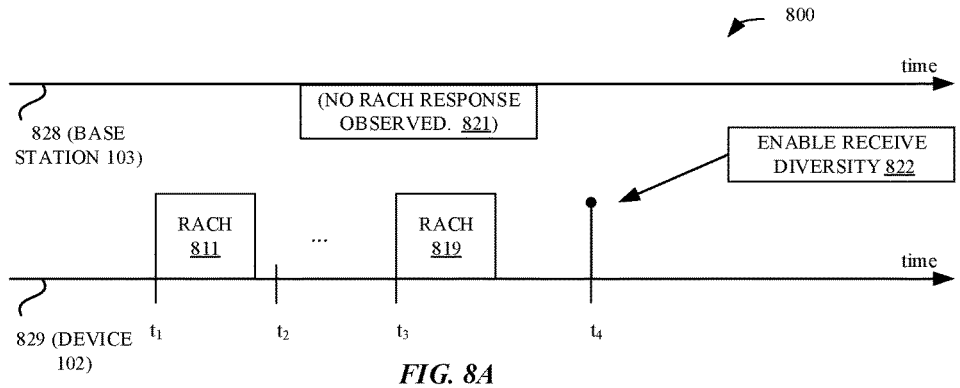
FIGS. 8A, 8B, 8C, 9A, 9B, and 9C illustrate exemplary measurements, according to some embodiments.

FIG. 8A illustrates an absence of observed DL transmissions after one or more RACH messages. Axis 828 is a timeline of base station activity and axis 829 is a timeline of UL transmission activity. At a time $t_1$, the device 102 transmits a RACH 811. After the time $t_2$, the device 102 transmits one or more additional RACH messages culminating in RACH 819. The wireless device observes no response (indicated in the figure as 821). Alternatively, the number of failed RACH messages exceeds a threshold in a given time interval. At $t_4$, the device 102 causes transition 506 to occur to enable a receive diversity chain (indicated as 822).

Figure 8B:
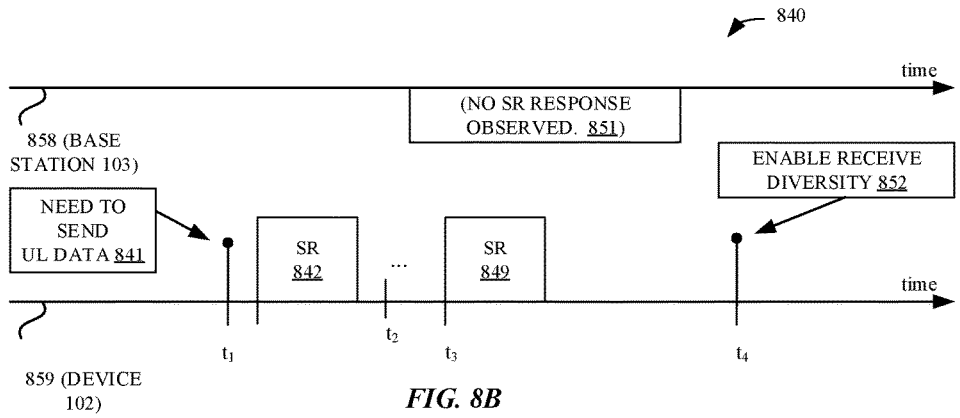

FIG. 8B illustrates an absence of observed DL transmissions after one or more SR (scheduling request) messages. Axis 858 is a timeline of base station activity and axis 859 is a timeline of UL transmission activity. At a time $t_1$, the device 102 determines a need to send UL data and subsequently sends SR 842. After the time $t_2$, the device 102 transmits one or more additional SR messages culminating in SR 849. The wireless device observes no response (indicated in the figure as 851). A number of consecutive failed SR requests has exceeded a threshold. At $t_4$, the device 102 causes transition 506 to occur to enable a receive diversity chain (indicated as 852).

Figure 8C:
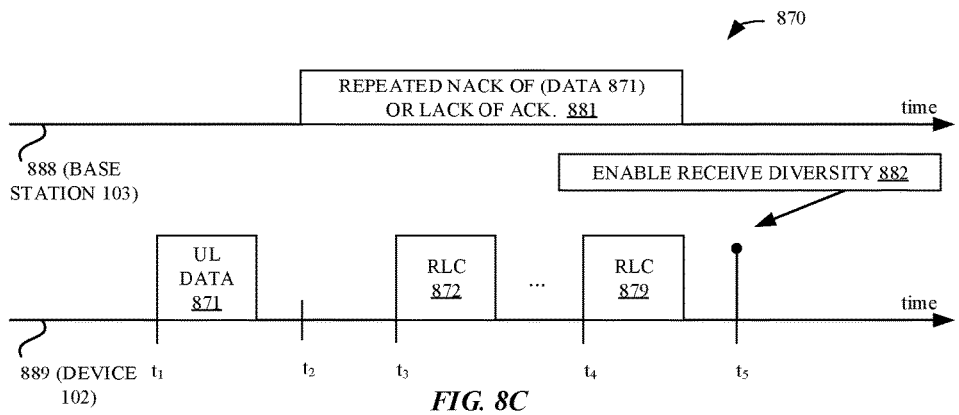

FIG. 8C illustrates repeated DL NACK messages or an absence of ACK messages. Axis 888 is a timeline of base station activity and axis 889 is a timeline of UL transmission activity. At a time $t_1$, the device 102 sends UL data 871 and subsequently determines RLC retransmissions are necessary. After the time $t_3$, the device 102 transmits one or more RLC retransmissions culminating in RLC retransmission 879. The wireless device observes no response (indicated in the figure as 851). Alternatively, the number of RLC retransmissions has exceeded a threshold. At $t_4$, the device 102 causes transition 506 to occur to enable a receive diversity chain (indicated as 882).

Figure 9A:
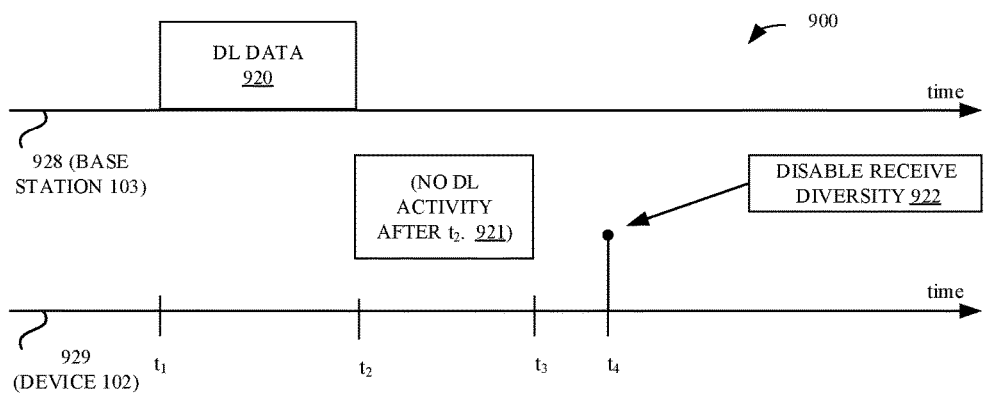

FIG. 9A illustrates an absence of observed DL transmissions DL data activity. Axis 928 is a timeline of base station activity and axis 929 is a timeline of UL transmission activity. From a time $t_1$ to a time $t_2$, the device 102 observes DL transmission activity indicated as DL data 920. From the time $t_2$ to a time $t_3$, the device 102 observes no DL transmission activity (the absence is indicated as 921). At $t_4$, the device 102 causes transition 503 to occur to disable a receive diversity chain (indicated as 922) since apparently there is currently no DL data.

Figure 9B:
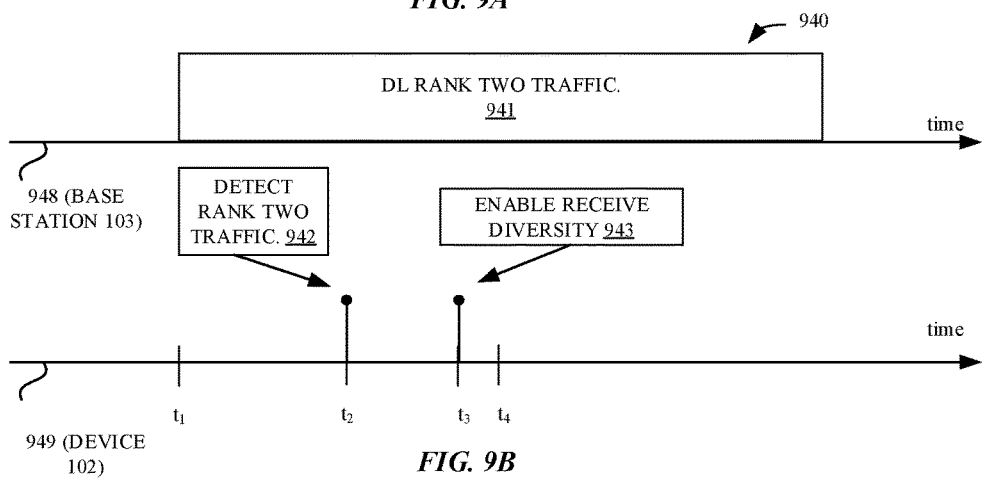

FIG. 9B illustrates detection of DL rank two traffic. Axis 948 is a timeline of base station activity and axis 949 is a timeline of UL transmission activity. From a time $t_1$, the base station 103 transmits DL rank two traffic 941. At a time $t_2$, the device 102 detects rank two traffic (indicated as 942). At a time $t_3$, the device 102 causes transition 506 to occur to enable a receive diversity chain (indicated as 922) to assist in demodulation of the rank two traffic 941.

Figure 9C:
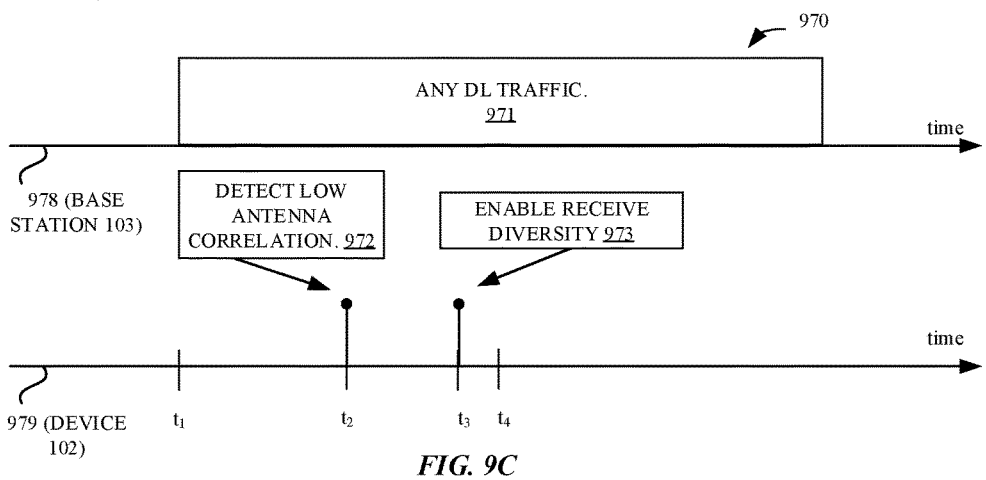

FIG. 9C illustrates detection of any DL traffic. Axis 978 is a timeline of base station activity and axis 979 is a timeline of UL transmission activity. From a time $t_1$, the base station 103 transmits any DL traffic 971. At a time $t_2$, the device 102 detects low antenna correlation. This detection, in some embodiments, occurs during a probing interval, for example 633 of FIG. 6. At a time $t_3$, the device 102 causes transition 506 to occur to enable a receive diversity chain (indicated as 973) to assist in demodulation of the traffic 971. The device 102, in some embodiments will also report channel rank to the base station, for example, at the time $t_4$.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection.

Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Multiple access schemes can be based on time division, frequency division, and hybrids of these, for example direct sequence spread spectrum code division. When a transmitter has multiple antennas, more than one receiver can be served at the same time based on beamforming if the transmitter has channel state information. When both the transmitter and the receiver have two or more antennas, multiple streams can be sent by the transmitter to the receiver. These streams can be separated at the receiver when channel state information is known with respect to the transmit and receive antennas. Each transmitted stream corresponds to a particular transmit vector based on a decomposition of a joint channel matrix.

Representative Exemplary Apparatus

Figure 10:
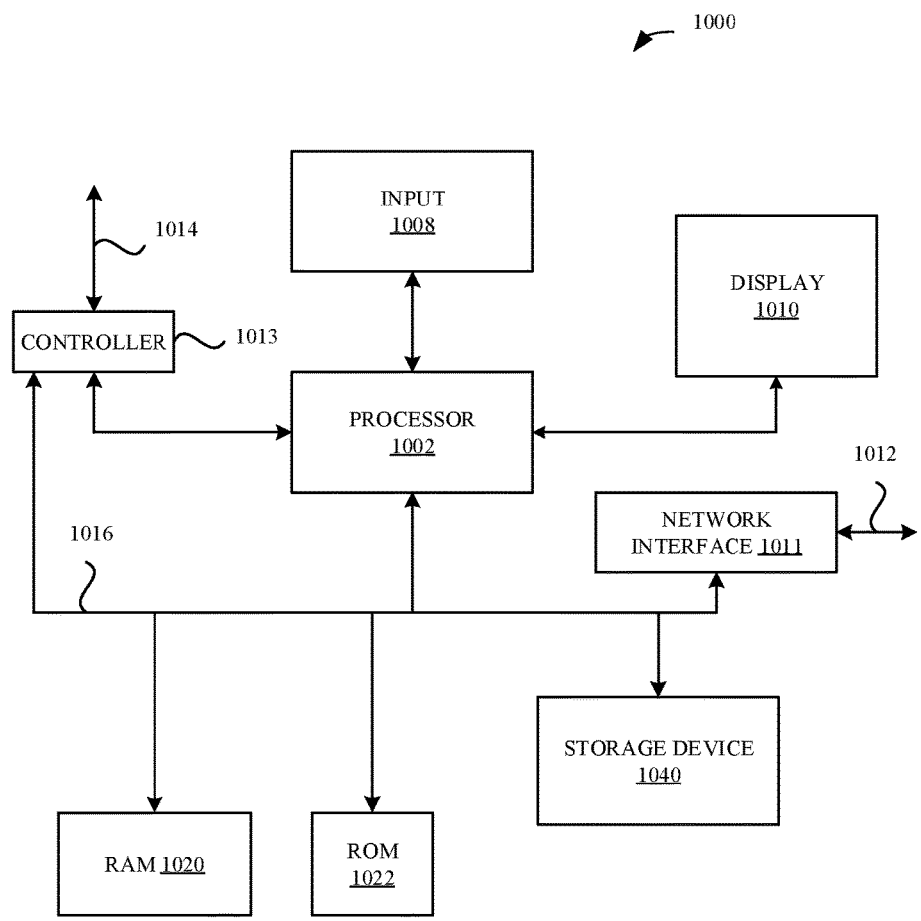
FIG. 10 illustrates an exemplary apparatus for implementation of the embodiments disclosed herein, according to some embodiments.

FIG. 10 illustrates in block diagram format an exemplary computing device 1000 that can be used to implement the various components and techniques described herein, according to some embodiments. In particular, the detailed view of the exemplary computing device 1000 illustrates various components that can be included in the wireless device 102 illustrated in FIGS. 1, 2A and 2B. As shown in FIG. 10, the computing device 1000 can include a processor 1002 that represents a microprocessor or controller for controlling the overall operation of computing device 1000. The computing device 1000 can also include a user input device 1008 that allows a user of the computing device 1000 to interact with the computing device 1000. For example, the user input device 1008 can take a variety of forms, such as a button, keypad, dial, touch screen, audio input interface, visual/image capture input interface, input in the form of sensor data, etc. Still further, the computing device 1000 can include a display 1010 (screen display) that can be controlled by the processor 1002 to display information to the user (for example, information relating to incoming, outgoing, or active communication session). A data bus 1016 can facilitate data transfer between at least a storage device 1040, the processor 1002, and a controller 1013. The controller 1013 can be used to interface with and control different equipment through an equipment control bus 1014. The computing device 1000 can also include a network/bus interface 1011 that couples to a data link 1012. In the case of a wireless connection, the network/bus interface 1011 can include wireless circuitry, such as a wireless transceiver and/or baseband processor.

The computing device 1000 also includes a storage device 1040, which can comprise a single storage or a plurality of storages (e.g., hard drives), and includes a storage management module that manages one or more partitions within the storage device 1040. In some embodiments, storage device 1040 can include flash memory, semiconductor (solid state) memory or the like. The computing device 1000 can also include a Random Access Memory ("RAM") 1020 and a Read-Only Memory ("ROM") 1022. The ROM 1022 can store programs, utilities or processes to be executed in a non-volatile manner. The RAM 1020 can provide volatile data storage, and stores instructions related to the operation of the computing device 1000.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method, by a user equipment (UE) comprising a primary antenna associated with a primary receive chain, one or more secondary antennas, one or more secondary receive chains, and a switch that associates one or more of the secondary antennas with one or more of the secondary receive chains, the method comprising:
   estimating a first channel condition based on i) a first baseband signal received via the primary receive chain, and ii) a second baseband signal received via one or more of the one or more secondary receive chains, to produce a first estimated channel condition, wherein the first channel condition is associated with a wireless link between the UE and a base station;
   estimating, based on the first estimated channel condition, that a battery power savings with respect to an acceptable throughput will be achieved by not providing diversity samples of the wireless link via a first secondary receive chain of the one or more secondary receive chains;
   powering down the first secondary receive chain;
   estimating a second channel condition based on a third baseband signal received via the primary receive chain to produce a second estimated channel condition, wherein the second channel condition is associated with the wireless link between the UE and the base station;
   estimating, based on the second estimated channel condition, a signal to noise ratio (SNR) value;
   determining, based on the SNR value, a diversity probing period decision value; and
   when the diversity probing period decision value is affirmative:
      powering up a second secondary receive chain of the one or more secondary receive chains, and
      probing the wireless link.

2. The method of claim 1, further comprising:
   sending, prior to the estimating the second channel condition, a first report to the base station, wherein the first report is based on the first estimated channel condition; and
   sending, subsequent to the estimating the second channel condition, a second report to the base station, wherein the second report is based on the second estimated channel condition.

3. The method of claim 2, wherein the first estimated channel condition is based on one or more of a UE transmit power, an amount of rank two traffic received from the base station, an estimated correlation between the primary antenna and the secondary antenna, or an absence of scheduled traffic from the base station.

4. The method of claim 2, wherein the probing the wireless link comprises:
   estimating a third channel condition based on i) a fourth baseband signal received via the primary receive chain, and ii) a fifth baseband signal received via the second secondary receive chain, to produce a third estimated channel condition;
   forming a third report based on the third estimated channel condition,
   powering down the second secondary receive chain, and
   sending, subsequent to the sending the second report, the third report to the base station.

5. The method of claim 1, wherein the second estimated channel condition comprises a statistic, and the statistic comprises an indication of one or more of i) a result of detecting whether a first number of consecutive failed random access channel attempts (RACHs) exceed a RACH threshold, and/or ii) a result of detecting whether a second number of consecutive failed scheduling request (SR) attempts exceed an SR threshold.

6. Wireless circuitry comprising:
   a baseband processor configured to perform control logic;
   a memory coupled to the baseband processor;
   a primary antenna;
   a primary receive chain coupled to the primary antenna and to the baseband processor;
   a secondary antenna;
   a secondary receive chain coupled to the secondary antenna and to the baseband processor;
   a memory, wherein the memory comprises instructions, that when executed by the control logic, cause the wireless circuitry to perform steps comprising:
      estimating a first channel condition based on i) a first baseband signal received via the primary receive chain, and ii) a second baseband signal received via the secondary receive chain, to produce a first estimated channel condition, wherein the first channel condition is associated with a wireless link between a user equipment (UE) and a base station;
      estimating, based on the first estimated channel condition, that a battery power savings with respect to an acceptable throughput will be achieved by not providing diversity samples via the secondary receive chain;
      powering down the secondary receive chain;
      estimating a second channel condition based on a third baseband signal received via the primary receive chain to produce a second estimated channel condition, wherein the second channel condition is associated with the wireless link between the UE and the base station;
      estimating, based on the second estimated channel condition, a signal to noise ratio (SNR) value;

determining, based on the SNR value, a diversity probing period decision value; and when the diversity probing period decision value is affirmative:
powering up the secondary receive chain, and
probing the wireless link.

7. A method, by a user equipment (UE) comprising a primary antenna associated with a primary transceiver chain and a secondary antenna associated with a secondary receive chain, the method comprising:

receiving, from a base station, first downlink signals using the primary antenna and the secondary antenna;

transmitting, to the base station, first uplink signals using at least the primary antenna;

processing the first downlink signals to produce a first statistic;

producing a second statistic based on the first uplink signals;

producing a third statistic based on a first history of downlink signals and a second history of uplink signals;

determining a secondary receive chain decision value, wherein the determining is based on the first statistic, the second statistic, and/or the third statistic;

when the secondary receive chain decision value indicates that a battery power savings with respect to an acceptable throughput will likely be achieved by powering down the secondary receive chain:
powering down the secondary receive chain, and
receiving, from the base station, second downlink signals using the primary antenna only to produce second baseband signals; and when the secondary receive chain decision value does not indicate that the battery power savings with respect to the acceptable throughput will likely be achieved by powering down the secondary receive chain:
receiving, from the base station, third downlink signals using the primary antenna and the secondary antenna.

8. The method of claim 7, further comprising:
estimating a second channel condition based on the second baseband signals to produce a second estimated channel condition;
determining a fourth statistic, wherein the fourth statistic comprises an indication of one or more of i) a result of detecting whether a first number of consecutive failed random access channel attempts (RACHs) exceed a RACH threshold, and/or ii) a result of detecting whether a second number of consecutive failed scheduling request (SR) attempts exceed an SR threshold;

when the fourth statistic indicates that the RACH threshold was exceeded or that the SR threshold was exceeded:
powering up the secondary receive chain to provide diversity samples to a baseband processor.

9. The method of claim 7, wherein the second statistic is based on a UE transmit power.

10. The method of claim 7, wherein the first statistic is based on an amount of rank two traffic received from the base station.

11. The method of claim 7, wherein the first statistic is based on an estimated correlation between the primary antenna and the secondary antenna.

12. The method of claim 7, wherein: i) the second history of uplink signals comprises indications of random access channel (RACH) attempts, and ii) the third statistic is based on detecting whether a first number of consecutive RACH attempts is below a RACH threshold.

13. The method of claim 7, wherein: i) the first history of downlink signals comprises indications of scheduling request (SR) attempts, and ii) the third statistic is based on detecting whether a second number of consecutive SR attempts is below an SR threshold.

14. The method of claim 7, wherein: i) the first history of downlink signals comprises indications of radio link control (RLC) retransmission attempts, and ii) the third statistic is based on detecting whether a third number of RLC retransmission attempts in an RLC time window is below an RLC threshold.

15. The method of claim 7, wherein the first statistic is based on detecting an absence of scheduled downlink traffic from the base station.

16. The method of claim 15, wherein the first statistic is based on measurements performed over first and second evaluation intervals in parallel, wherein the second evaluation interval is shorter than the first evaluation interval.

17. The method of claim 16, further comprising:
adapting a duration of the second evaluation interval based on learned inter-arrival time of scheduling grants.

18. The method of claim 17, wherein the adapting increases the second evaluation interval by an increase value based on a forthcoming retransmission attempt.

19. The method of claim 18, wherein the adapting is based on a traffic class.

20. The method of claim 19, wherein, when the traffic class is a foreground traffic class, the increase value is greater than when the traffic class is a background traffic class.

* * * * *